Aug. 5, 1969  L. F. PERWAS  3,458,938
CENTER-LINE GAUGES
Filed Oct. 24, 1965

INVENTOR.
LUDWIG F. PERWAS

United States Patent Office 3,458,938
Patented Aug. 5, 1969

3,458,938
CENTER-LINE GAUGES
Ludwig F. Perwas, Mountainview Ave.,
Orangeburg, N.Y. 10962
Filed Oct. 24, 1965, Ser. No. 504,317
Int. Cl. G01b 3/00, 5/00
U.S. Cl. 33—174                                    4 Claims

ABSTRACT OF THE DISCLOSURE

A device for checking the center-line position of a radius on a workpiece above a working surface or reference plane by taking only one dial indicator reading from a center-line gauge instead of several readings and calculations. This is accomplished by a flat piece of material having a plurality of arcs on its perimeter and within the parallel surface area through slots having at least one side radially aligned with a related arc while the non-radially aligned slot surfaces are irregularly shaped to avoid being utilized as a gauge surface. An attachable precision alignment arm is used for quicker setups.

---

The primary object of my invention is to provide for an instant setting of a scriber for marking a line on a workpiece.

Another object of my invention is to provide for instantly obtaining a dial indicator reading of a relative required measurement.

The related objects of my invention is to provide a more useful, compact and time saving checking instrument.

Still another object of my invention is to provide an attachable extrusion construction for checking the squareness of adjacent surfaces of a workpiece and quickly setting the gauge alignment surfaces when the radius being checked has adjacent square surfaces. It can be detached when checking radii with or without adjacent square surfaces.

These and other objects of my invention will become apparent from a reading of the following specification and claims, together with the illustrated drawings, wherein:

Figure 9:
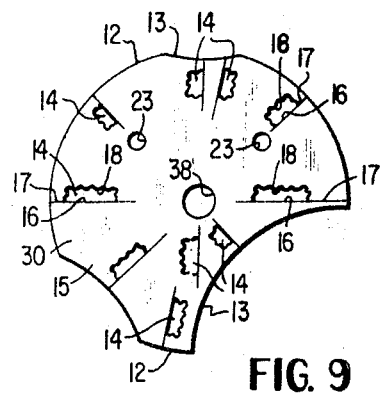

FIGURE 9 is a plan view of a modification more suitable for exceptionally large sizes and illustrating the non-measuring surfaces of the center-line slots having a non-straight or irregular surface to avoid taking dial readings from said surfaces, whereas the center-line measuring surfaces have precision flat in line surfaces that are perpendicular or square to the flat area surfaces 15 of the gauges.

Figure 4:
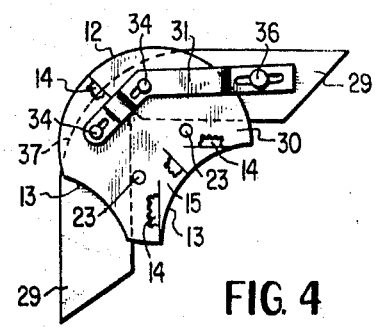
FIGURE 4 is a plan view of a modification similar to the gauge shown in FIGURE 9 illustrating the use of a convex arc and the assembly of a ninety degree dual arm alignment attachment.
Figure 5:
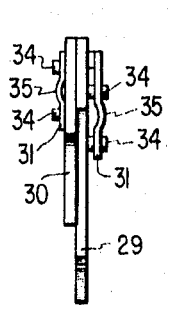
FIGURE 5 is a vertical lateral view of FIGURE 4.
Figure 6:
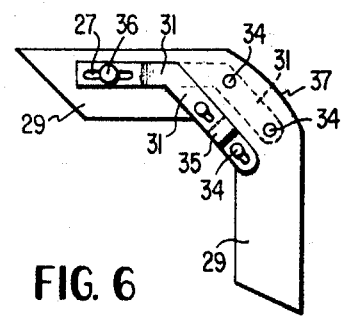
FIGURE 6 is a rear view of FIGURE 4 less the radius gauge showing the side to which is attached said radius gauge when an inside arc is being utilized.
Figure 7:
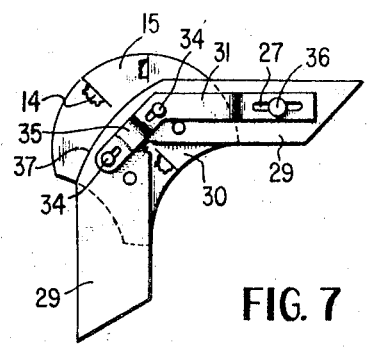
FIGURE 7 is a plan view similar to FIGURE 4 except that the radius gauge is secured on the reverse side as an inside arc of the gauge being utilized.
Figure 8:
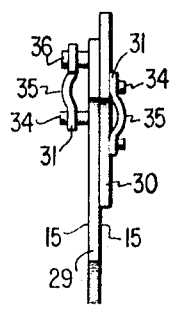
FIGURE 8 is a vertical lateral view of FIGURE 7.
Figure 10:
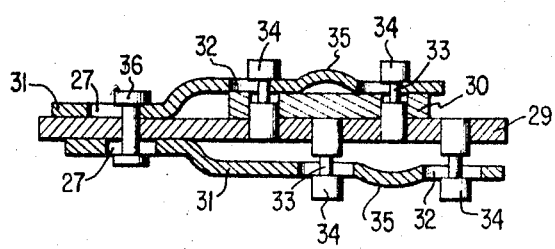

FIGURE 10 is an enlarged cutaway view of FIGURE 4.

A radius gauge 11 consisting of a flat piece of material having along its edges, a plurality of convex arcs 12 and concave arcs 13 with relative through gauge slots 14 located within the parallel flat areas 15. A slot gauge surface 16 is located radially, or precisely on center of a related edge arc with an aligned scored line 17 for easy identification of the gauge surface 16. Surfaces that are not radially located are irregularly shaped to avoid being utilized as gauge reference surfaces and they are non-measurement surfaces 18.

Figure 1:
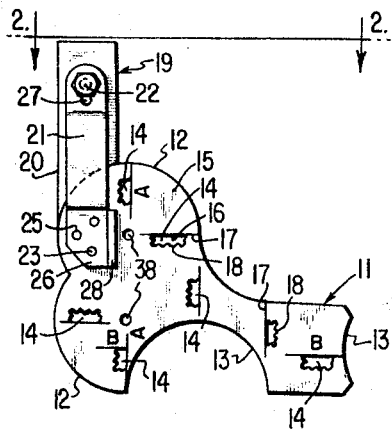
FIGURE 1 is a plan view of the gauge illustrating the slotted center-line construction and an attached squareness alignment extension arm.
Figure 2:
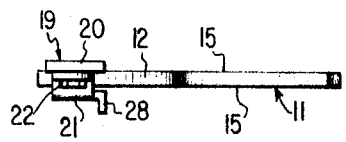
FIGURE 2 is a horizontal lateral view taken along the line 2—2 of FIGURE 1.
Figure 3:
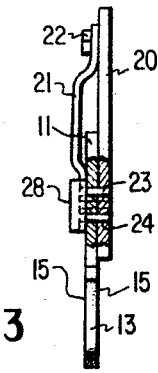
FIGURE 3 is a vertical view of FIGURE 1.

A single extension alignment arm 19 shown in FIGURES 1, 2, and 3 is composed of a back plate 20 to which is movably secured a flexible holder 21 by the bolt 22 at one end while at the other end several alignment pins 23 are firmly secured to plate 20, so as to engage corresponding bores 24 within the flat area 15 and bores 25 at the holder end 26 for securing the radius gauge 11 firmly in place. A slot 27 provides for free movement of the spring holder 21. A projected grip 28 is provided for engaging and disengaging the extension arm 19.

In FIGURE 4 a dual right angle extension arm 29 is utilized with the basic circular radius gauge 30. The spring tempered holder 31 is a modification having securing slots 32 that engage undercuts 33 of the alignment pins 34 securing the radius gauge 30 firmly in place. This is more clearly shown in FIGURE 10. A raised curved portion 35 is a pressure release for engaging and disengaging the holder 31 which is movably secured by the rivet 36 and slot 27. A clearance radius 37 which may be angular is provided to allow the use of several various size gauges 30 to be used with one size dual extension arm 29. The bores 38 engage corresponding projections of a holder that is secured to the scriber position of a standard height gauge. The holder secured in the height gauge automatically aligns the center-line gauge surfaces 16 of the gauges 11 and 30 when utilized in this manner. Holder and height gauge are not shown.

The center-line gauge slot construction may be applied to the various standard radius gauges in existence.

It is to be understood that the form of my invention, herewith shown, described and illustrated is to be taken as a preferred example of the same, and that various changes in size, shape and arrangement of parts may be resorted to without departing from the scope of my invention.

What is claimed:

1. A gauge comprising a flat member having a plurality of circular arc shaped edges, a plurality of slots in said member, each of said slots having one straight wall portion, the remaining wall portions of each slot having an irregular shape for preventing their use as references, at least one alignment reference line defined by the straight wall portion of at least two of said plurality of slots formed with their respective straight wall portions in colinear relationship, each of said circular arc shaped edges having at least one of said plurality of slots associated therewith and acting as a measurement slot, each of said measurement slots having its straight wall portion aligned with the center of curvature of the associated arc shaped edge and extending in the same direction as at least one reference line.

2. The gauge of claim 1 wherein at least one of the slots defining a reference line also is a measurement slot.

3. The gauge of claim 1 including at least one scored line on said member extending from at least one of said straight wall portions.

4. The gauge of claim 1 in combination with at least one alignment extension arm and means for attaching said at least one arm to said member.

References Cited

UNITED STATES PATENTS

| | | | |
|---|---|---|---|
| 379,206 | 3/1888 | Brackett | 33—104 |
| 2,398,066 | 4/1946 | Whale | 33—185 |
| 2,592,316 | 4/1952 | Moss | 33—174 |
| 2,667,703 | 2/1954 | Zumkeller | 33—185 |
| 2,918,727 | 12/1959 | Genetti | 33—174 |

SAMUEL S. MATTHEWS, Primary Examiner